United States Patent
Nabeshima et al.

(10) Patent No.: US 7,351,766 B2
(45) Date of Patent: Apr. 1, 2008

(54) THERMOPLASTIC RESIN COMPOSITION AND ENGINEERING PLASTIC COMPOSITION

(75) Inventors: Yasuhiko Nabeshima, Hiroshima (JP); Atsunori Koshirai, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 119 days.

(21) Appl. No.: 10/504,849

(22) PCT Filed: Feb. 28, 2003

(86) PCT No.: PCT/JP03/02363

§ 371 (c)(1),
(2), (4) Date: Mar. 14, 2005

(87) PCT Pub. No.: WO03/072620

PCT Pub. Date: Sep. 4, 2003

(65) Prior Publication Data

US 2005/0159533 A1      Jul. 21, 2005

(30) Foreign Application Priority Data

Feb. 28, 2002  (JP) ............................. 2002-054460
Mar. 1, 2002   (JP) ............................. 2002-056536
Sep. 9, 2002   (JP) ............................. 2002-262651

(51) Int. Cl.
  *C08L 51/00*   (2006.01)
(52) U.S. Cl. ........................ 525/70; 525/80; 525/148
(58) Field of Classification Search ............... 525/70, 525/80, 148
  See application file for complete search history.

(56) References Cited

U.S. PATENT DOCUMENTS

| 4,614,773 | A | * | 9/1986 | Sugio et al. ............... 525/391 |
| 4,831,082 | A | * | 5/1989 | Peascoe ...................... 525/148 |
| 5,187,227 | A | * | 2/1993 | Tera et al. .................... 525/65 |
| 5,360,865 | A | * | 11/1994 | Aoyama et al. ............. 525/67 |
| 5,362,795 | A | * | 11/1994 | Matsumoto et al. ........ 524/501 |
| 6,316,527 | B1 | * | 11/2001 | Meyer et al. ............... 523/201 |
| 6,417,319 | B1 | * | 7/2002 | Shibuya et al. ............. 528/196 |
| 6,541,548 | B2 | * | 4/2003 | Weidner et al. ............. 524/108 |

FOREIGN PATENT DOCUMENTS

| JP | 9-136929   | 5/1997 |
| JP | 11-35831   | 2/1999 |
| JP | 2000-17136 | 1/2000 |
| JP | 2000-34321 | 2/2000 |
| JP | 2000-204236 | 7/2000 |
| JP | 2001-131398 | 5/2001 |
| JP | 2001-302899 | 10/2001 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

The thermoplastic resin composition of the present invention is obtained by graft polymerizing a monomer that composes a polymer that is compatible with or has affinity for polycarbonate resin in the presence of a polymer that is incompatible with polycarbonate resin; wherein, the weight average molecular weight of a soluble component that dissolves in chloroform is 10,000 to 100,000. In the case of using this thermoplastic resin composition in an engineering plastic, fluidity can be improved without impairing the characteristics of the engineering plastic. The engineering plastic composition of the present invention is preferably used in the field of housings and various parts of OA equipment, telecommunications equipment and home appliances such as photocopiers, facsimiles, televisions, radios, tape recorders, video decks, personal computers, printers, telephones, information terminals, refrigerators and microwave ovens, as well as in other fields such as automotive parts.

14 Claims, No Drawings

THERMOPLASTIC RESIN COMPOSITION AND ENGINEERING PLASTIC COMPOSITION

TECHNICAL FIELD

The present invention relates to a thermoplastic resin composition having superior improved fluidity, and an engineering plastic composition having superior fluidity, separation resistance, heat resistance, impact resistance and flame resistance.

BACKGROUND ART

Engineering plastics are widely used in various fields including office automation (OA) equipment, telecommunications equipment, electrical and electronic equipment, home appliances, automobiles and construction due to their superior mechanical strength, heat resistance, electrical characteristics, dimensional stability and so forth. However, they also have the problems of a high molding and forming temperature and inferior melt fluidity in the case of, for example, polycarbonate resins.

On the other hand, in the case of their molded products being used in the housings and parts of OA equipment such as photocopiers, facsimiles and personal computers, telecommunications equipment or electrical and electronic equipment, there has recently been a need for resin modifiers and compositions that enhance the melt fluidity, namely injection moldability, of polycarbonate resins due to the increasingly complex shapes of these molded products, the molding of lines, indentations and other surface irregularities in these molded products, and the use of increasingly thin-walled molded products in consideration of lighter weight and resource conservation.

In improving the melt fluidity of polycarbonate resin, (1) a typical method involves reducing the molecular weight of the polycarbonate itself serving as the matrix resin. In addition, fluidity has also been reported to be improved by forming a polymer alloy from a styrene resin and a polycarbonate resin such as a polymer alloy composition with acrylonitrile-butadiene-styrene resin (ABS plastic), a polymer alloy composition with a styrene resin such as rubber-denatured polystyrene resin (high impact polystyrene, HIPS), or a polymer alloy composition with acrylonitrile-styrene resin (AS resin) (Japanese Examined Patent Application, Second Publication Nos. 38-15225, 43-6295 and 43-13384).

In addition, methods that have been proposed for the purpose of further improving fluidity include (3) a method in which a polyester oligomer is added (Japanese Examined Patent Application, Second Publication No. 54-21455), (4) a method in which an oligomer of polycarbonate is added (Japanese Unexamined Patent Application, First Publication No. 3-24501), (5) a method in which a low molecular weight styrene copolymer is added (Japanese Examined Patent Application, Second Publication No. 52-784, and Japanese Unexamined Patent Application, First Publication No. 11-181198), (6) a method in which a polymer having a polyorganosiloxane segment is added (Japanese Unexamined Patent Application, First Publication No. 11-35831), and (7) a method in which a polymer obtained by polymerization of styrene is added in the presence of polyalkyl (meth)acrylate (Japanese Unexamined Patent Application, First Publication No. 2000-239477).

However, although the method of (1) in which the molecular weight of the polycarbonates self is reduced greatly improves fluidity, due to reducing the molecular weight beyond that which is necessary, the superior impact resistance and heat resistance of the polycarbonate is lost. In addition, since chemical resistance also decreases, there are limitations on improving melt fluidity by lowering molecular weight while maintaining the superior characteristics of polycarbonate.

In addition, the formation of a polymer alloy from styrene resin and ABS resin or HIPS resin of (2) is used in numerous molded material fields by taking advantage of its superior characteristics of heat resistance, impact resistance and fluidity. However, due to the increasing complexity of the shapes of injection molded products in recent years, the molding of lines, indentations and other surface irregularities in these molded products, and the use of increasingly thin-walled molded products in consideration of lighter weight and resource conservation, resin modifiers and compositions that flirter enhance the fluidity, and namely injection moldability, of polycarbonate resins are required. In order to obtain effective fluidity with such polymer alloy compositions, it is necessary to increase the blended amount of ABS resin and so forth, thereby placing limitations on improvement of fluidity while maintaining the superior characteristics of polycarbonate in the form of heat resistance, impact resistance and flame resistance.

In addition, although the method of (3) involving the addition of a polyester oligomer and the method of (4) involving the addition of a polycarbonate oligomer are effective for improving fluidity, they have the problem of causing a significant decrease in the superior heat resistance and impact resistance of polycarbonate.

In addition, the method of (5) in which a low molecular weight styrene copolymer is added makes it possible to improve melt fluidity to a certain extent while maintaining heat resistance. However, in addition to the effect on improvement of fluidity being inadequate, since this low molecular weight styrene copolymer also has insufficient compatibility, molded products are susceptible to the occurrence of surface layer separation while also resulting in accompanying problems of insufficient impact strength, weld appearance, which is important for practical use, and surface impact. In order to improve this compatibility, methods are employed in which are added a low molecular weight AS resin, aromatic vinyl resin having a polar group with an SP value of greater than 9.3 to less than 11.5, and copolymer consisting of a (meth)acrylate ester having a functional group such as an epoxy group and an aromatic vinyl compound (Japanese Unexamined Patent Application, First Publication Nos. 8-127686, 11-181197 and 2000-239477).

However, as will be described in the examples, these are merely copolymers consisting of low molecular weight styrene and a polar monomer, and although ice layer separation is improved by improving compatibility, effects for improving fluidity still remain inadequate, thus resulting in the problem of impact resistance decreasing is a large amount is added to improve fluidity.

In addition, in the method of (6) in which a polymer having a polyorganosiloxane segment is added, and in the method of (7) in which a polymer is added that has been obtained by polymerizing styrene in the presence of a polyalkyl(meth)acrylate, melt fluidity can be improved considerably while maintaining satisfactory heat resistance of the polycarbonate resin. However, due to inadequate compatibility, surface layer separation occurs easily in molded products while also leaving accompanying problems of inadequate impact strength, weld appearance, which is important for practical use, and surface impact.

On the basis of the above, all of the examples of the prior art are still inadequate with respect to improving melt fluidity without impairing the superior characteristics of engineering plastics as exemplified by polycarbonate.

DISCLOSURE OF THE INVENTION

In order to solve the aforementioned problems, the object of the present invention is to provide a thermoplastic resin composition and engineering plastic containing the same for which the fluidity (moldability and formability) of the engineering plastic is improved without impairing the characteristics of the engineering plastic (e.g., heat resistance, separation resistance, impact resistance and flame resistance).

The gist of the present invention lies in a thermoplastic resin composition, which is obtained by graft polymerizing a monomer that composes a polymer (B) that is compatible with or has affinity for polycarbonate resin, in the presence of a polymer (A) that is incompatible with polycarbonate resin, and the weight average molecular weight of a soluble component that dissolves in chloroform is 10,000 to 100,000.

The soluble component that dissolves in chloroform preferably has a weight average molecular weight of 10,000 to 50,000, and more preferably 10,000 to 30,000.

In addition, the thermoplastic resin composition of the present invention preferably has a melt viscosity as measured with a capillary rheometer of 300 Pa·s or less.

Polymer (A) is preferably a polymer (A-1) having for its main component a polyalkyl acrylate having a glass transition temperature of 25° C. or lower, or a polymer (A-2) having for its main component polyorganosiloxane.

Polymer (B) is preferably one type selected from the group consisting of a polymer (B-1) having for its main component a homopolymer or copolymer of at least one type of alkyl(meth)acrylate and having a glass transition temperate that exceeds 25° C., a polymer (B-2) having for its main component a copolymer of an aromatic alkenyl compound and a vinyl cyanide compound, and a polymer (B-3) having for its main component a copolymer of an alkyl(meth) acrylate and a vinyl cyanide compound or an aromatic alkenyl compound.

In addition, polymer (B) is more preferably a polymer (B-2) having for its main component a copolymer of an aromatic alkenyl compound and a vinyl cyanide compound.

In addition, the gist of the present invention lies in a fluidity improver (D) for engineering plastics composed of the aforementioned thermoplastic resin composition.

Moreover, the gist of the present invention lies in an engineering plastic composition comprising the blending of 0.1 to 100 parts by mass of the aforementioned fluidity improver (D) to 100 parts by mass of an engineering plastic (C).

The engineering plastic (C) preferably has for its main component a polycarbonate resin. Furthermore, "main component" refers to a content of 50% by mass or more.

In addition, an organic finer (E) is preferably added to the engineering plastic composition at 1 to 100 parts by mass to 100 parts by mass of the engineering plastic composition.

The organic filler (E) is preferably a fibrous reinforcer composed of glass fiber and/or carbon fiber.

In addition, a flame retardant (F) is preferably added to the engineering plastic composition at 0.1 to 30 parts by mass to 100 parts by mass of the engineering plastic composition.

Moreover, a non-drip agent (G) is preferably added to the engineering plastic composition at 0.05 to 5 parts by mass to 100 parts by mass of the engineering plastic composition.

The flame retardant (F) is preferably a phosphate ester compound.

In addition, the nondrip agent (G) is preferably a fluoroolefin resin.

MODES FOR CARRYING OUT WE INVENTION

The following provides a detailed description of the present invention.

Thermoplastic Resin Composition (Fluidity Improver (D))

The thermoplastic resin composition of the present invention is obtained by graft polymerizing a monomer that composes a polymer (B) having compatibility with or affinity for polycarbonate resin, in the presence of a polymer (A) that is incompatible with polycarbonate resin; wherein, the weight average molecular weight of a soluble component that dissolves in chloroform is within the range of 10,000 to 100,000.

In addition, this thermoplastic resin composition is suitable as a fluidity improver of an engineering plastic, and is able to improve its melt fluidity without impairing the superior characteristics of the engineering plastic (e.g., heat resistance, separation resistance, impact resistance and flame resistance).

Here, the aforementioned "polycarbonate resin" refers to a commonly known polycarbonate resin having a bisphenol A backbone that is obtained by reacting bisphenol A with phosgene or a carbonate ester such as phenyl carbonate.

In addition, the aforementioned "polymer (A) that is incompatible with polycarbonate resin" refers to that in which surface layer separation (laminar separation) is observed by a tape peeling test to be described later by producing a molded test piece using an injection molding machine after melting and kneading at 270° C. in a double screw extruder 10% by mass of polymer (A) and 90% by mass (total: 100% by mass) of polycarbonate resin (having a viscosity average molecular weight of 17,000 to 25,000).

On the other hand, the aforementioned "polymer (B) having compatibility with or affinity for polycarbonate resin" refers to that in which surface layer separation (laminar separation) is not observed by a tape peeling test by producing a molded test piece in the same manner as the method described above using 10% by mass of polymer (B) and 90% by mass (total: 100% by mass) of polycarbonate resin (having a viscosity average molecular weight of 17,000 to 25,000).

The tape peeling test (crosscut adhesion test: JIS K-5400) refers to that for evaluating surface layer separation resistance by forming 100 squares of 1 mm² each with a cutter knife in the surface of a molded test piece obtained in the manner described above, sufficiently adhering adhesive tape to the squares, vigorously peeling off the tape, and then visually confirming those squares from which the tape was peeled.

In addition, a more severe evaluation test can be carried out by making horizontally diagonal cuts with a cutter knife in the ejector pin marks left in a molded test piece, and then visually confirming whether the surface layer separates.

In the present description, that in which surface layer separation is not confirmed due to either of the aforementioned tests is defined as "polymer (B) having compatibility with or affinity for polycarbonate resin", while that in which surface layer separation is confirmed in either of the tests is defined as "polymer (A) that is incompatible with polycarbonate resin".

Examples of the aforementioned polymer (A) that is incompatible with polycarbonate resin include a copolymer (A-2) having for its main component a polyorganosiloxane such as polydimethylsiloxane or polydiphenyldimethylsiloxane; a copolymer (A-1) having for its main component a polyalkyl acrylate having a glass transition temperature of 25° C. or lower and composed of an alkyl acrylate in which the alkyl group has two or more carbon atoms such as polyethyl acrylate, poly-n-butyl acrylate, poly-2-ethylhexyl acrylate, polylauryl acrylate and polystearyl acrylate; a copolymer having for its main component an aromatic vinyl polymer such as polystyrene or poly-α-methylstyrene; and a copolymer having for its main component a polyester resin such as polyethylene terephthalate or polybutylene terephthalate. Among these, polymer (A-2) having for its main component a polyorganosiloxane, and polymer (A-1) having for its main component a polyalkyl acrylate having a glass transition temperature of 25° C. or lower, are more preferable since the melt viscosity of the resin itself is low, and they have a considerable effect on improving the fluidity of engineering plastics.

The glass transition temperature (Tg) of polymer (A) that is incompatible with polycarbonate resin is preferably 25° C. or lower, more preferably 0° C. or lower, and even more preferably −20° C. or lower. In the case the glass transition temperature exceeds 25° C., there is the possibility of the balance between the superior fluidity improving effects and mechanical characteristics such as impact resistance being disrupted.

Examples of the aforementioned polymer (B) having compatibility with or affinity for polycarbonate resin include a polymer (B-1) for which the glass transition temperature exceeds 25° C. and has for its main component a homopolymer or copolymer of at least one type of alkyl(meth)acrylate such as polymethylmethacrylate, methylmethacrylate/cyclohexylmethacrylate copolymer or methylmethacrylate/phenylmethacrylate copolymer; a polymer (B-2) having for its main component a copolymer of an aromatic alkenyl compound and a vinyl cyanide compound such as styrene/crylonitrile copolymer or styrene/methacrylonitrile copolymer; a polymer (B-3) having for its main component a copolymer of alkyl(meth)acrylate and vinyl cyanide compound or aromatic alkenyl compound such as methyhmethacrylate/styrene copolymer or methylmethacrylate/acrylonitrile copolymer; and a polymer having for its main component an aliphatic polyester such as poly-s-caprolactone and polycarbonate. Among these, polymer (B-1) for which the glass transition temperature exceeds 25° C. and having for its main component a homopolymer or copolymer of at least one type of alkyl(meth)acrylate, polymer (B-2) having for its main component a copolymer of an aromatic alkenyl compound and a vinyl cyanide compound, and polymer (B-3) having for its main component a copolymer of an alkyl(meth)acrylate and a vinyl cyanide compound or an aromatic alkenyl compound, are more preferable since they are effective for improving melt fluidity (moldability and formability) without impairing the superior characteristics of engineering plastics (e.g., heat resistance, impact resistance and flame resistance). Moreover, among these, polymer (B-2) having for its main component a copolymer of an aromatic alkenyl compound and a vinyl cyanide compound is the most preferable in terms of its superior fluidity, separation resistance, impact resistance, flame resistance and thermal stability.

The glass transition temperature (Tg) of polymer (B) that has compatibility with or affinity for polycarbonate resin is preferably higher than 25° C., more preferably 50° C. or higher, even more preferably 70° C. or higher, and most preferably 90° C. or higher. In the case the glass transition temperature is lower than 50° C., there is the possibility of the balance between the superior fluidity improving effects and mechanical characteristics such as heat resistance being disrupted.

In this manner, in the thermoplastic resin composition of the present invention, the use of a graft polymerized thermoplastic resin composition prevents surface layer separation by a polymer (A) that is incompatible with polycarbonate resin and results in even better appearance, impact strength, weld appearance, which is important for practical use, and surface impact in molded products of this thermoplastic resin composition as well as engineering plastic compositions containing the same.

In addition, although it is preferable that the entire monomer that composes the aforementioned polymer (B) be grafted to polymer (A), in the case of using this thermoplastic resin composition as a fluidity improver of engineering plastic (C), there is no particular problem if the entire monomer that composes polymer (B) is not grafted to polymer (A) within a range over which the fluidity (moldability and formability) of engineering plastic (C) is improved without impairing the superior characteristics such as heat resistance, impact resistance and flame resistance it inherently possesses.

In the thermoplastic resin composition of the present invention, although there are no particular limitations on the ratio of polymer (A) and polymer (B) provided it is within a range in which both polymer (A) and polymer (B) are present, in consideration of the balance between fluidity and mechanical properties, it is preferable that polymer (A) be present at 1 to 80% by mass and polymer (B) be present at 20 to 99% by mass, more preferable that polymer (A) be present at 3 to 70% by mass and polymer (B) be present at 30 to 97% by mass, even more preferable that polymer (A) be present at 5 to 40% by mass and polymer (B) be present at 60 to 95% by mass, and most preferable that polymer (A) be present at 10 to 30% by mass and polymer (B) be present at 70-90% by mass.

In the case the amount of polymer (A) is less than 1% by mass, there is the possibility of being unable to obtain adequate fluidity improving effects. In addition, although all of polymer (A) is preferably grafted to polymer (B), if the amount of polymer (A) is greater than 80% by mass, it becomes difficult for all of polymer (A) to form grazing bonds with polymer (B), thereby resulting in the risk of polymer (A), which is incompatible with polycarbonate resin, causing surface layer separation and reducing the appearance, impact strength, weld appearance important for practical use and surface impact in a molded product of the thermoplastic resin composition and a molded product of an engineering plastic containing that thermoplastic resin composition.

In addition, although all of the graft polymer of polymer (A) and polymer (B) is preferably a non-crosslinked graft polymer, all of the graft polymer is not required to be non-crosslinked provided it is within a range that does not impair the superior fluidity improving characteristics, and there is no particular problem with a crosslinked structure insoluble in an organic solvent such as chloroform or acetone being partially present.

Although the weight average molecular weight of the soluble component of the thermoplastic resin composition that dissolves in chloroform, excluding a partial crosslinked structure tat is insoluble in solvent, is preferably 10,000 to 100,000 in consideration of the balance among physical properties such as moldability, heat resistance and impact resistance, the lower limit is more preferably 15,000, even more preferably 18,000 and most preferably 20,000. In addition, the upper limit is more preferably 70,000, even more preferably 50,000 and most preferably 30,000. Furthermore, at least one type of a non-crosslinked graft polymer composed of polymer (A) and polymer (B), non-grafted polymer (A) and non-grafted polymer (B) is contained in the soluble component that dissolves in chloroform.

In the case the aforementioned weight average molecular weight of the soluble component is less than 10,000, since the amount of low molecular weight substances becomes relatively large, there is the possibility of a decrease in various functions such as heat resistance and rigidity.

In addition, there is also a greater risk of the occurrence of problems relating to defective appearance such as the generation of smoke during molding, mist, contamination of the machinery and fisheyes.

On the other hand, if the aforementioned weight average molecular weight is greater than 100,000, then the melt viscosity of the thermoplastic resin composition itself increases, resulting in the possibility of being unable to obtain adequate fluidity improving effects.

In addition, in the thermoplastic resin composition of the present invention, the melt viscosity is preferably 300 Pa·s or less.

Furthermore, the aforementioned melt viscosity refers to the melt viscosity as measured using a capillary rheometer (such as the RH7 Twin Capillary Rheometer manufactured by Borlin Ltd.) under conditions of a nozzle D of 1 mm, L/D of 16, barrel temperature of 170° C. and shearing rate of 3,000 sec$^{-1}$.

The process for producing the thermoplastic resin composition of the present invention comprises graft polymerizing a monomer that composes polymer (B) that is compatible with or has affinity for polycarbonate resin, in the presence of polymer (B) that is incompatible with polycarbonate resin. An example of a polymerization method is a method (i) in which polymer (A) and polymer (B) are polymerized continuously by, for example, emulsion polymerization, suspension polymerization, solution polymerization, living anionic polymerization in bulk polymerization or living radical polymerization in a TEMPO system, RAFT system or ATRP system.

Examples of the aforementioned method (i) in which polymer (A) and polymer (B) are polymerized continuously include a method in which a macromonomer having at least one unsaturated group is synthesized in a side chain or terminal of polymer (A) followed by synthesis of polymer (B) in the presence of that macromonomer, and a method in which a macromonomer having at least one unsaturated double bond is synthesized in a side chain or terminal of polymer (B) followed by synthesis of polymer (A) in the presence of that macromonomer.

The following provides an explanation of a method for synthesizing a macromonomer having at least one unsaturated double bond in a side chain or terminal of polymer (A) followed by synthesis of polymer (B) in the presence of that macromonomer as a preferable process for producing the thermoplastic resin composition of the present invention.

(Macromonomer Synthesis)

The method for synthesizing the macromolecule comprises adding a polymerization catalyst as necessary to a mixture of, for example, water, emulsifier, 0.5 to 5 parts by mass of monomer having two more unsaturated groups to 100 parts by mass of a monomer mixture that forms polymer (A-1) having for its main component polyalkylacrylate, polymerization initiator, chain transfer agent and so forth followed by polymerizing at a high temperature to synthesize the macromonomer.

Examples of the aforementioned emulsifier include nonionic emulsifier, anionic emulsifier, cationic emulsifier and amphoteric emulsifier.

Specific examples of the aforementioned nonionic emulsifiers include polyoxyethylenealkylether, polyoxyethylenealkylarylether, dialkylphenoxypoly(ethyleneoxide)ethanol, polyvinylalcohol, polyacrylic acid and alkyl cellulose.

Specific examples of the aforementioned anionic emulsifiers include fatty acid salts, higher alcohol Sulfite esters, liquid fatty oil sulfate esters, sulfates of aliphatic amines and aliphatic amides, fatty alcohol phosphate, phosphate of dibasic fatty acid ester, fatty acid amide sulfonates, alkyl aryl sulfonates, and naphthalene sulfonates of formalin condensation products.

Specific examples of the aforementioned cationic emulsifiers include fatty acid amine salts, quaternary ammonium salts and alkyl pyridinium salts.

Specific examples of the aforementioned amphoteric emulsifiers include alkyl betaines.

The alkyl acrylate of the monomer mixture used to prepare the aforementioned polymer (A-1) having for its main component a polyalkyl acrylate should have an alkyl group having 2 to 20 carbon atoms, and the alkyl group may be linear or branched, specific examples of which include ethyl acrylate, butyl acrylate, 2-methylbutyl acrylate, 3-methylbutyl acrylate, hexyl acrylate, heptyl acrylate, octyl acrylate, 2-ethylhexyl acrylate, decyl acrylate, lauryl acrylate, tridecyl acrylate, cetyl acrylate, stearyl acrylate and eicosyl acrylate. One type or two or more types can be used. Among these, when considering fluidity and cost, ethyl acrylate, butyl acrylate, 2-ethylhexyl acrylate, lauryl acrylate, tridecyl acrylate and stearyl acrylate are preferably, while ethyl acrylate, butyl acrylate and 2-ethylhxyl acrylate are particularly preferable.

Although specific examples of the aforementioned monomer having two or more unsaturated groups include allyl (meth)acrylate, triallyl cyanurate, triallyl isocyanurate, ethylene glycol di(meth)acrylate, propylene glycol di(meth)acrylate, 1,3-butylene glycol di(meth)acrylate and 1,4-butylene glycol di(meth)acrylate, in consideration of the fluidity of the engineering plastic composition, monomers having two or more types of unsaturated groups with different reactivities such as allyl (meth)acrylate, triallyl cyanurate and triallyl isocyanurate are preferable (although triallyl cyanurate and triallyl isocyanurate have three allyl groups, the reactivity of the first allyl group that reacts and the reactivity of the second and third allyl groups that react are different).

In addition to the aforementioned monomers, aromatic vinyl monomers such as styrene, α-methyl styrene, p-methylstyrene, α-methyl-p-methyl styrene, p-methoxy styrene, o-methoxy styrene, 2,4-dimethyl styrene, chlorostyrene and bromostene; α-olefins such as ethylene and propylene; esters of vinyl alcohols such as vinyl acetate; compounds containing an epoxy group such as vinyl glycidyl ether and allyl glycidyl ether, dicarboxylic anhydrides such as maleic anhydride; vinyl monomers having a functional group such as an amino group, hydroxy group, mercapto group, carboxylate group, carboxylic anhydride, dicarboxylic acid, halogen group or halogenated carbonyl group; and one type or two or more types of copolymerizing components such as (meth)acrylic acid and methyl(meth)acrylic acid can be used in combination so as to be 50% by mass or less of all polymerization components. However, in consideration of the balance with impact resistance, these are more preferably present at 30% by mass or less, and even more preferably present at 20% by mass or less.

Examples of the aforementioned polymerization initiator include peroxides such as tert-butyl hydroperoxide and cumene hydroperoxide, azo-based initiators such as azo-bis-isobutyronitrile, and redox-based initiators combining an oxidizing agent and a reducing agent.

Specific examples of redox-based initiators include sulfoxylate-based initiators combining ferrous sulfate, sodium ethylene diamine tetraacetate; rongalite and hydroperoxide.

In addition, examples of the aforementioned chain transfer agent include n-octyl mercaptan and tert-dodecyl mercaptan.

In addition, another macromonomer synthesis method comprises polymerizing cyclic organosiloxane in the presence of a graft crossing agent such as γ-methacryloyl oxypropyl dimethoxy methylsilane, vinyl methyl dimethoxysilane, γ-mercaptopropyl dimethoxy methylsilane or p-vinyl phenyl methyl dimethoxysilane.

A cyclic organosiloxane having at three-member ring or larger is used for the aforementioned organosiloxane, and that having a 3 to 6-member ring is used preferably. Examples of such cyclic organosiloxanes include hexamethyl cyclotrisiloxane, octamethyl cyclotetrasiloxane, dodecamethyl cyclopentasiloxane, dodecamethyl cyclohexasiloxane, trimethyl triphenyl cyclotrisiloxane, tetramethyl tetraphenyl cyclotetrasiloxane and octaphenyl cyclotetrasiloxane. These may be used alone or as a mixture of two or more types.

In addition, the aforementioned graft crossing agent is a siloxane having a functional group that does not react during preparation of the polyorganosiloxane, but does react during subsequent graft polymerization, the compounds represented by the following formulas (1) through (4) can be indicated as specific examples thereof.

$$CH_2=\overset{R^2}{\underset{|}{C}}COO(CH_2)_pSiR^1{}_n(OR^3)_{(3-n)} \quad (1)$$

$$CH_2=CHSiR^1{}_n(OR^3)_{(3-n)} \quad (2)$$

$$HS(CH_2)_pSiR^1{}_n(OR^3)_{(n-3)} \quad (3)$$

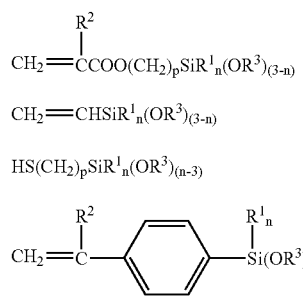
(4)

Furthermore, in the aforementioned formulas (1) through (4), $R^1$ and $R^3$ represent a methyl group, ethyl group, propyl group or phenyl group, $R^2$ represents a hydrogen atom or methyl group, n represents 0, 1 or 2, and p represents an integer of 1 to 6.

Among these compounds, (meth)acryloyl oxyalkyl siloxanes capable of forming the unit represented by the aforementioned formula (1) are capable of efficiently forming a graft chain due to their high grafting efficiency, and the use of these compounds is preferable since even better impact resistance is obtained. Among (meth)acryloyl oxyalkyl siloxanes, methacryloyl oxyalkyl siloxanes are preferable, specific examples of which include δ-methacryloyl oxyethyl dimethoxy methylsilane, γ-methacryloyl oxypropyl methoxy dimethyl silane, γ-methacryloyl oxypropyl dimethoxy methylsilane, γ-methacryloyl oxypropyl trimethoxysilane, γ-methacryloyl oxypropyl ethoxy diethoxysilane, γ-methacryloyl oxypropyl diethoxy methylsilane and δ-methacryloyl oxybutyl diethoxy methylsilane.

Examples of the vinyl siloxane capable of forming the unit represented by the aforementioned formula (2) include vinyl methyl dimethoxysilane and vinyl trimethoxysilane.

Examples of the mercaptosiloxane capable of forming the unit represented by the aforementioned formula (3) include γ-mercaptopropyl dimethoxy methylsilane, γ-mercaptopropyl trimethoxysilane and γ-mercaptopropyl diethoxy ethylsilane.

In addition, examples of a compound capable of forming the unit represented by the aforementioned formula (4) include p-vinyl phenyl methyl dimethoxysilane.

In his manner, a macromonomer can be synthesized by copolymerizing 0.5 to 5 parts by mass of a monomer having two or more unsaturated groups or a graft crossing agent with 100 parts by mass of polymer (A) that is incompatible with polycarbonate resin.

In consideration of the balance among fluidity, impact resistance and separation resistance, the aforementioned macromonomer preferably has 0.7 to 5 parts by mass, and more preferably 1 to 3 parts by mass, of a monomer having two or more functional groups or a graft crossing agent with respect to 100 parts by mass of polymer (A) that is incompatible with polycarbonate resin. In the case the monomer having two or more functional groups or the graft crossing agent is present at less than 0.5 parts by mass, there is the risk of the aforementioned macromonomer being unable to adequately form the required graft bonds with polymer (B), thereby resulting in the possibility of surface layer separation occurring in the macromonomer resulting in decreased appearance, impact strength, or weld appearance important for practical we and surface impact in a molded product of the thermoplastic resin composition or engineering plastic composition containing the same. In addition, if the content of monomer having two or more functional groups or graft crossing agent is too large, there is the risk of proportion of crosslinked structure insoluble in chloroform or other organic solvent being excessively large in the thermoplastic resin composition resulting in impairment of superior fluidity improving effects.

There are no particular limitations on the weight average molecular weight of the aforementioned macromonomer and although it may be in the form of a crosslinked structure provided it is within a range that does not impair superior fluidity, in consideration of the balance among various physical properties, the molecular weight of the chloroform soluble component is preferably 5,000 to 100,000, and the lower limit is more preferably 10,000 and even more preferably 20,000. In addition, the upper limit is more preferably 70,000 and even sore preferably 50,000. In the case the weight average molecular weight is less than 5,000, since the amount of low molecular weight substances increases relatively, there is the risk of a decrease in various functions such as heat resistance and rigidity. In addition, there is also the risk of a high possibility of the occurrence of problems relating to defective appearance such as generation of smoke during molding, mist, contamination of the machinery and fisheyes. In addition, there is also the risk of a smaller contribution to improvement of fluidity by the macromonomer, thereby preventing the obtaining of adequate fluidity improving effects.

In addition, if the weight average molecular weight of the macromonomer is greater than 100,000, melt viscosity increases and there is the possibility of being unable to obtain adequate fluidity improving effects. In addition, since the contribution of the compatible component also decreases, there is the risk of decreased separation resistance and its accompanying various physical properties.

(Polymerization of Vinyl Monomer Forming Polymer (B) or Mixtures Thereof)

A mixture containing at least one type of vinyl monomer that forms polymer (B) having compatibility with or affinity for polycarbonate resin, polymerization initiator, chain transfer agent and so forth is supplied to the polymerization system of the aforementioned macromonomer followed by polymerizing at a high temperature.

Examples of the aforementioned vinyl monomers or mixtures thereof that form polymer (B) having compatibility with or affinity for polycarbonate resin include one type or two or more types of vinyl monomers selected from alkyl methacrylates such as methyl methacrylate, methyl methacrylate/cyclohexyl methacrylate and methyl methacrylate/phenyl methacrylate, and mixtures of these vinyl monomers; vinyl monomer mixtures selected from aromatic alkenyl compounds and vinyl cyanide compounds such as acrylonitrile/styrene; vinyl monomer mixtures selected from alkyl methacrylates and vinyl cyanide compounds or aromatic alkenyl compounds such as methyl methacrylate/styrene and methyl methacrylate/acrylonitrile; aliphatic polyester monomers such as ε-caprolactone; and, bisphenol A and diphenyl carbonate monomer mixtures that form polycarbonates. Among these, one type or two or more types of vinyl monomers or vinyl monomer mixtures selected from alkyl methacrylates such as methyl methacrylate, methyl methacrylate/cyclohexyl methacrylate and methyl methacrylate/phenyl methacrylate, vinyl monomer mixtures selected from aromatic alkenyl compounds and vinyl cyanide compounds such as acrylonitrile/styrene, and vinyl monomer mixtures selected from alkyl methacrylates and vinyl cyanide compounds or aromatic alkenyl compounds such as methyl methacrylate/styrene and methyl methacrylate/acrylonitrile are more preferable since they are effective in improving fluidity (moldability and formability) without impairing the superior characteristics such as heat resistance, impact resistance and flame resistance of engineering plastic (C), and among these, vinyl monomer mixtures selected from aromatic alkenyl compounds and vinyl cyanide compounds such as acrylonitrile/styrene are the most preferable in consideration of the balance among fluidity, flame resistance, impact resistance and thermal stability.

The same polymerization initiators and chain transfer agents used during macromonomer synthesis can be applied for the aforementioned polymerization initiator and chain transfer agent.

As has been explained above, in the case of using the thermoplastic resin composition of the present invention together with an engineering plastic (C), fluidity (moldability and formability) can be improved without impairing the superior characteristics such as heat resistance, impact resistance and flame resistance inherently possessed by engineering plastic (C).

Engineering Plastic (C)

There are no particular limitations on the engineering plastic (C) of the present invention provided is one of various types of conventionally known engineering plastics, examples of which include polyphenyl ethers, polycarbonates, syndiotactic polystyrenes, nylon compounds such as 6-nylon and 6,6-nylon, polyarylates, polyphenylene sulfides, polyether ketone, polyether ether ketone, polyether sulfones, polyamide imides, polyether imides and polyacetals. Among these, polyphenylene ethers and polycarbonates are preferable and polycarbonates are more preferable in consideration of fluidity improving effects. In addition, these may be used alone or two or more types may be used.

In addition, examples of the aforementioned polycarbonates include 4,4'-dioxydiaryl alkane polycarbonates such as 4,4'-dihydroxydiphenyl-2,2-propane (i.e., bisphenol A)-based polycarbonates.

The molecular weight of the aforementioned engineering plastic (C) should be suitably determined as desired, and there are no particular limitations on molecular weight in the present invention. However, in the case the engineering plastic (C) is a polycarbonate, the viscosity average molecular weight is preferably 10,000 to 50,000, and more preferably 15,000 to 30,000.

Engineering plastic (C) can be produced by various conventionally known methods. For example, in the case of producing 4,4'-dihydroxydiphenyl-2,2-propane-based polycarbonate, then a method can be employed in which 4,4'-dihydroxydiphenyl-2,2-propane is used for the raw material and reacted by blowing in phosgene in the presence of an aqueous alkaline solution and solvent, or a method can be employed in which 4,4'-dihydroxydiphenyl-2,2-propane and diester carbonate are transesterified in the presence of a catalyst.

In addition, various types of engineering plastic-based polymer alloys can also be used in the engineering plastic (C) of the present invention. The polymer alloys contain for their main component an engineering plastic resin blended with a thermoplastic resin other than an engineering plastic, examples of which include styrene resins such as ABS, HIPS, PS and PAS, acrylic resins, polyolefin resins and elastomers, provided the polymer alloy is present within a range that does not impair the superior heat resistance, impact resistance and flame resistance inherently possessed by the engineering plastic, such as 50% by mass or less (with respect to 100% by mass of the engineering plastic).

Engineering Plastic Composition 1 (C)+(D)

In the engineering plastic composition of the present invention, the ratio between the thermoplastic resin composition (fluidity improver (D)) and the engineering plastic (C) should be suitably determined according to the desired physical process and so forth. Although there are no particular imitations on this ratio in the present invention, in order to for the engineering plastic composition to obtain effective fluidity improving effects without lowering the performance (e.g., heat resistance, impact strength) of the engineering plastic (C), the thermoplastic resin composition (fluidity improver (D)) should preferably used at 0.1 to 100 parts by mass, more preferably 1 to 30 parts by mass, and even more preferably 2 to 10 parts by mass with respect to 100 parts by mass of engineering plastic (C).

Moreover, various types of conventionally known additives, stabilizers, reinforcing agents, inorganic fillers, heat resistance modifiers, flame retardants, fluoroolefins and so forth may be blended into the engineering plastic composition of the present invention as necessary. For example, talc, mica, calcium carbonate, glass fibers, carbon fibers or potassium titanate fibers and so forth can be contained in order to improve molded product strength, rigidity and flame resistance. Moreover, other engineering plastic compositions such as polyethylene terephthalate may be blended to improve chemical resistance and so forth, and rubbery elastic bodies composed of core-shell dual-layer structure may be blended to improve impact resistance.

The specific physical property values of the aforementioned engineering plastic composition should be suitably adjusted as desired, and there are no particular limitations thereon in the present invention. However, with respect to fluidity, melt fluidity as determined in accordance with the measurement conditions of the examples to be described later is preferably at least 30% higher with respect to the base resin.

In addition, with respect to impact strength, the Izod impact strength is preferably 700 J/m or more when tested in compliance with ASTM D256.

In addition, with respect to separation resistance, there is preferably no surface layer separation observed when evaluated in compliance with he previously mentioned tape peeling test.

In addition, with respect to heat resistance, the deflection temperature under load is preferably 125° C. when tested in compliance with ASTM D648.

In addition, with respect to flame resistance, the LOI (oxygen index) is preferably 25% or more when tested in compliance with JIS K7201.

An engineering plastic composition having these physical properties can be said to exhibit extremely superior balance among fluidity, heat resistance, appearance and impact strength.

The engineering plastic composition of the present invention is obtained by mixing kneading) at least engineering plastic (C) and the aforementioned thermoplastic resin composition (fluidity improver (D)).

Various types of conventionally known mixing and kneading methods can be used for the mixing method, examples of which include methods using a Henschel mixer, Banbury mixer, single-screw extruder, double-screw extruder, double roller, kneader or Brabender will.

In addition, a desired composition can also be obtained by preparing a master batch containing a mixture of a thermoplastic resin composition and engineering plastic (C), followed by remixing the master batch with engineering plastic (C) to as to increase the ratio of the thermoplastic resin composition in advance.

Inorganic Filler (E)

There are no particular limitations on the inorganic filler (E) used in the present invention, and although examples include glass fibers, glass milled fibers, glass flakes, glass beads, carbon fibers, silica, alumina, titanium oxide, calcium sulfate powder, gypsum, gypsum whiskers, barium sulfate, talc, mica, clay, calcium silicate, carbon black, graphite, iron powder, copper powder, molybdenum disulfide, silicon carbide, silicon carbide fibers, bronze fibers, stainless steel fibers, potassium titanate fibers or whiskers and aromatic polyamide fibers, it is preferably a fibrous reinforcing agent selected from commercially available glass fibers or pitch-based and PAN-based carbon fibers referred to as milled fibers, cut fibers or glass powder and so forth. These fibers may be used alone or in combination, and they may be used after subjecting to various types of surface treatment.

Although there are no particular limitations on the glass fibers, they preferably have an average fiber diameter of 5 to 15 μm and average fiber length of 2 to 5 mm. Although there also no particular limitations on the carbon fibers, and either PAN-based or pitch-based carbon fibers should be used, they preferably having an average fiber diameter of 6 to 9 μm and average fiber length of 3 to 8 mm.

Reinforced Engineering Plastic Composition (C+(D)+(E)

The reinforced engineering plastic composition of the present invention is a composition containing as its main components the aforementioned engineering plastic (C), fluidity improver (D) and inorganic filler (E).

Here, the blending ratio between engineering plastic (C) and fluidity improver (D) (total 100% by mass) is preferably 50 to 99% by mass and more preferably 70 to 99% by mass of engineering plastic (C), and 50 to 1% by mass and preferably 40 to 5% by mass of fluidity improver (D). If the blended amount of engineering plastic (C) is less than 50% by mass, heat resistance and strength are inadequate, and if the blended amount of fluidity improver (D) is less than 1% by mass, fluidity improving effects are inadequate. The blended amount of engineering plastic (C) is even more preferably 80 to 99% by mass and most preferably 90 to 98% by mass, while the blended amount of fluidity improver (D) is even more preferably 20 to 1% by mass and most preferably 10 to 2% by mass.

In addition, the blended amount of inorganic filler (E) is preferably 1 to 100 parts by mass with respect to a total of 100 parts by mass of engineering plastic (C) and fluidity improver (D). If the content of inorganic filler (E) is less than 1 part by mass, there is the possibility of the target strength, rigidity and heat resistance being unable to be obtained, and if the content of inorganic filler (E) exceeds 100 parts by mass, melt fluidity may decrease making melt molding extremely difficult. Although the content of inorganic filler (E) is more preferably 5 to 80 parts by mass and most preferably 20 to 50 parts by mass relative to a total of 100% by mass of engineering plastic (C) and fluidity improver (D), it is determined by making a comprehensive evaluation based on the type of inorganic filler, type and amount of engineering plastic (C) and type and amount of fluidity improver (D) in consideration of the strength, rigidity, heat resistance, fluidity and other required characteristics of the molded product.

Moreover, the reinforced engineering plastic composition of the present invention may be blended as necessary with various types of conventionally known additives, stabilizers, compatibility agents, reinforcing agents, impact resistance modifiers, flame retardants and other anti-dripping agents such as fluoroolefins. For example, various types of inorganic, metal salt, halogen, phosphorous or silicon-based flame retardants and anti-dripping agents such as fluoroolefins may be contained to improve flame resistance of a molded product. Moreover, other thermoplastic resin compositions such as polyethylene terephthalate may be blended to improve chemical resistance and so forth, or a rubbery elastic body and so forth composed of a core-shell dual-layer structure may be blended to improve impact resistance.

Next, an explanation is provided of a process for producing the reinforced engineering plastic composition of the present invention. The aforementioned reinforced engineering plastic composition is obtained by blending and kneading engineering plastic (C), fluidity improver (D) and inorganic filler (E) preferably at the aforementioned ratios along with various other arbitrary components as necessary such as flame retardants, non-drip agents, core-shell type grafted rubbery elastic bodies at suitable ratios. Although the blending and kneading at this time can be carried out using a method comprising preliminarily mixing with ordinarily used equipment such as a ribbon blender or drum blender, followed by blending and kneading using a Henschel mixer, Banbury mixer, single-screw extruder, double-screw extruder, multi-screw extruder or kneader. The use of a continuously extruding molding machine such as a single-screw extruder or multi-screw extruder that is a melt kneading machine equipped with a vent capable of removing as much as possible to a certain level volatile components by forcibly discharging from the vent during melt kneading, and particularly a melt kneading extruder equipped with a vent, is preferable.

In addition, an extruder equipped with a plurality of raw material supply sections in the direction of molding raw material flow can be used preferably.

The heating temperature during melt kneading is normally suitably selected within the range of 240 to 330° C.

Furthermore, contained components other than engineering plastic (C) and fluidity improver (D) can be added in advance during melt kneading with engineering plastic (C), fluidity improver (D) or other thermoplastic resins, namely in the form of a master batch.

Flame Retardant (F)

There are no particular limitations on flame retardant (F) used in the present invention, and specific examples include halogen-based flame retardants comprised of a combination of a halide compound such as halogenated bisphenol A, halogenated polycarbonate oligomers or brominated epoxy compounds and a flame retarding assistant such as antimony oxide, as well as phosphorous-based flame retardants such as organic phosphate esters, and silicone-based flame retardants such as branched phenyl silicone compounds. Among these, phosphate ester compounds are particularly preferable due to their environmental friendliness as well as their superior balance among cost, fluidity and flame resistance and other mechanical characteristics.

There are no particular limitations on the phosphate ester compounds, with those not containing halogens being preferable. An example of a phosphate ester compound is indicated in the following formula (5).

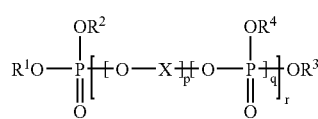

(5)

Here, $R^1$, $R^2$, $R^3$ and $R^4$ respectively and independently represent a hydrogen atom or organic group, X represents an organic group having a valence of 2 or larger, p represents 0 or 1, q represents an integer of 1 or more, and r represents an integer of 0 or more. In formula (5), the organic groups may or may not be substituted, and examples include alkyl groups, cycloalkyl groups and aryl groups.

In addition, examples of substituents in the case the organic groups are substituted include alkyl groups, alkoxy groups, aryl groups, aryloxy groups and arylthio groups. Moreover, other examples of substituents include groups that combine these substituents such as arylalkoxyalkyl groups as well as arylsulfonylaryl groups in which these substituents are combined by bonding by oxygen atoms, nitrogen atoms or sulfur atoms and so forth.

In addition, in formula (5), organic groups X having a valence of 2 or larger refer to groups having a valence of 2 or larger in which one or more hydrogen atoms bonded to a carbon atom can be removed from the aforementioned organic groups. Examples of which include an alkylene group, (substituted) phenylene group and groups derived from bisphenol in the form of multinuclear phenols. Preferable examples include bisphenol A, hydroquinone, resorcinol, diphenyl methane, dihydroxy diphenyl and dihydroxy naphthalene.

The phosphate ester compound may also be a monomer, oligomer, polymer or mixture thereof. Specific examples of which include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcin bisphosphate, resorcinol diphenyl phosphate, trioxybenzene triphosphate, cresyldiphenyl phosphate and their substituted forms and condensates.

Although there are no particular limitations on the aforementioned phosphate ester compounds, in the case of preventing mold adhesion when molding a thin-walled molded product at high temperatures, there are cases in which it preferable to use a compound having a monomer content of 3% by mass or less. Moreover, there are also cases in which compounds having an acid value (as determined according to JIS K6751) of 1 mg KOH/g or less are preferable in terms of thermal stability. In addition, there are cases in which it is preferable to use a phosphate ester compound in which phenol has a substituent such as an alkyl group from the viewpoint of moisture resistance and heat resistance.

Here, examples of commercially available halogen-free phosphate ester compounds include triphenyl phosphate ("TPP", Daihachi Chemical Industry), trixylenyl phosphate ("TXP", Daihachi Chemical Industry), resorcinol bis (diphenylphosphate) ("CR-733S", Daihachi Chemical Industry), 1,3-phenylene-tetraquis(2,6 dimethylphenyl) phosphate ester ("PX200", Daihachi Chemical Industry), 1,4-phenylene-tetraquis(2,6-dimethylphenyl) phosphate ester ("PX201", Daihachi Chemical Industry) and 4,4'-biphenylene-tetraquis (2,6-dimethylphenyl) phosphate ("PX202", Daihachi Chemical Industry).

Flame-Resistant Engineering Plastic Composition (C)+(D)+(F)

The content of flame retardant (F) is preferably 1 to 30 parts by mass, more preferably 2 to 25 parts by mass, and particularly preferably 3 to 20 parts by mass with respect to a total of 100 parts by mass of engineering plastic (C) and fluidity improver (D). Here, if the content of flame retardant (F) is less than 1 part by mass, there is the possibility of being unable to obtain the target flame resistance. In contrast, if the content of flame retardant (F) exceeds 30 parts by mass, there may a decrease in heat resistance or decrease in impact strength. Thus, the content of flame retardant (F) is determined by making a comprehensive judgment based on such factors as the type of flame retardant, type and amount of engineering plastic (C) and type and amount of fluidity improver (D) in consideration of the required flame resistance of the molded product.

The flame-resistant engineering plastic composition of the present invention may also contain a thermal stabilizer as necessary. Thermal stabilizers are additives that further prevent thermal oxidative deterioration of the flame-resistant engineering plastic composition, examples of which include phosphorous-based oxidation inhibitors, phenol-based oxidation inhibitors and sulfur-based oxidation inhibitors. Among these, phosphorous-based oxidation inhibitors, and particularly phosphite ester compounds, are used preferably. Examples of phosphite ester compounds in which the hydrogens of phosphorous acid are respectively and independently substituted with an alkyl group, aryl group, allyl-substituted aryl group and so forth.

Specific examples of the aforementioned phosphite ester compounds include trimethyl phosphite, triethyl phosphite, tributyl phosphite, tri(2-ethylhexyl) phosphite, tributoxyethyl phosphite, triphenyl phosphite, tricresyl phosphite, trixylenyl phosphite, tris(isopropylphenyl) phosphite, trisnonylphenyl phosphite, tris(2,4-di-t-butylphenyl) phosphite, trinaphthyl phosphite, cresyldiphenyl phosphite, xylenyldiphenyl phosphite, dibutyl phosphite, distearyl pentaerythritol diphosphite, bis(2,4-di-t-butylphenyl) pentaerythritol phosphite, bis(2,6-di-t-butyl-4-methylphenyl) pentaerythritol phosphite, 2,2-methylenebis (4,6-di-butylphenyl) octyl phosphite and tetraquis(2,4-di-t-butylphenyl)-4,4'-biphenylene-di-phosphite. Among these, triphenyl phosphite, tricresyl phosphite, trisnonylphenyl phosphite and tris(2,4-di-t-butylphenyl) phosphite are used preferably.

The content of the aforementioned phosphite ester compound is 0.01 to 2 parts by mass and preferably 0.1 to 1 part by mass with respect to a total of 100 parts by mass of engineering plastic (C) and fluidity improver (D). Here, if the content of the phosphite ester compound is less than 0.01 parts by mass, the effect of improving thermal oxidation stability diminish, and if the content exceeds 2 parts by mass, there is the risk of the occurrence of problems such as decreased heat resistance and generation of gas during molding.

A non-drip agent (G) can be additionally contained in the flame-resistant engineering plastic composition of the present invention for the purpose of preventing dripping of molten plastic during combustion. A fluoroolefin-based resin having for its main component a fluoroolefin resin can be contained as non-drip agent (G). The fluoroolefin resin is normally a polymer, copolymer or complex containing a fluoroolefin structure, examples of which include difluoroethylene polymer, tetrafluoroethylene polymer, tetrafluoroethylene-hexafluoropropylene copolymer, copolymers of tetrafluoroethylene and an ethylene-based monomer not containing fluorine, and a complex of tetrafluoroethylene polymer and a vinyl-based resin such as acrylic resin. Among these, polytetrafluoroethylene (PTFE) is preferable, and its average molecular weight is preferably 500,000 or more and particularly preferably 500,000 to 10,000,000. All known types of polytetrafluoroethylene can be used for the polytetrafluoroethylene applied in the present invention.

In addition, among the aforementioned polytetrafluoroethylenes, even greater prevention of dripping of molten resin can be imparted if a polytetrafluoroethylene is used that has the ability to form fibrils. There are no particular limitations on the polytetrafluoroethylene (PTFE) capable of forming fibrils, and examples include those that are classified as type 3 according to ASTM standards. Specific examples include Teflon (registered trademark) 6-J (Mitsui-Dupont Fluorochemical), Polyflon D-1, Polyflon F-103, Polyflon F201 (Daikin Industries), and CD1 and CD076 (Asahi ICI Fluoropolymers).

In addition to those classified into the aforementioned three types, other examples include Argofion F5 (Montefluos), Polyflon MPA and Polyflon FA-100 (Daikin Industries). These polytetrafluoroethylenes (PTFE) may be used alone or as a combination of two or more types.

The aforementioned polytetrafluoroethylenes (PTFE) having the ability to form fibrils can be obtained by, for example, polymerizing tetrafluoroethylene in an aqueous solvent in the presence of sodium, potassium and ammonium peroxidisulfide at a pressure of 1 to 100 psi and temperature of 0 to 200° C. and preferably 20 to 100° C.

The aforementioned non-drip agent (G) is preferably contained at 0.05 to 5 parts by mass and more preferably at 0.1 to 2 parts by mass with respect to a total of 100 parts by mass of engineering plastic (C) and fluidity improver (D). Here, if the content of non-drip agent (G) is less tan 0.05 parts by mass, there are cases in which the resistance to dripping of molten plastic may be inadequate for the target flame resistance, and even if the content exceeds 5 parts by mass, there is no corresponding improvement in effects while there may conversely be detrimental effects on impact resistance and appearance of molded products. Thus, the content of non-drip agent (G) can be suitably determined in consideration of the amounts of other components used and so forth according to, for example, the flammability test of UL-94.

A core-shell type grafted rubbery elastic body can also be contained in the flame-resistant engineering plastic composition of the present invention for the purpose of improving impact resistance and homogeneity. The content of this compound is preferably 1 to 30 parts by mass and more preferably 2 to 20 parts by mass with respect to a total of 100 parts by mass of engineering plastic (C) and fluidity improver (D).

The aforementioned core-shell type ted rubbery elastic body has a dual-layer structure composed of a core and a shell, with the core portion being in soft, rubbery state and the shell portion on its surfing being in a hard, plastic state, while the elastic body itself is in the form of powder (particulate state). The majority of the particulate state of this grafted rubbery elastic body retains its original form even after melting and blending the polycarbonate resin and styrene resin. As a result of the majority of this blended rubbery elastic body retaining to its original form, the effect is obtained of preventing surface layer separation.

There are various examples of the aforementioned core-shell type grafted rubbery elastic body. Commercially available examples include HiBlen B621 (Zeon), KM-330 (Rohm & Haas), Metablen W529, Metablen S2001, Metablen C223 and Metablen B621 (Mitsubishi Rayon).

An example of these is that obtained by polymerizing one type or two or more types of vinyl monomer in the presence of a rubbery polymer obtained from a monomer comprising mainly alkyl acrylates, alkyl methacrylates and dimethyl siloxanes. Here, preferable examples of alkyl acrylates and alkyl methacrylates comprise those having an alkyl group having 2 to 10 carbon atoms. Specific examples of which include ethyl acrylate, butyl acrylate, 2-ethylhexyl acrylate and n-octyl methacrylate. Examples of rubbery elastic bodies obtained from monomers comprising mainly these allyl acrylates include polymers obtained by reacting 70% by mass or more of alkyl acrylate with 30% by mass or less of another polymerizable vinyl monomer such as methyl methacrylate, acrylonitrile, vinyl acetate or styrene. Furthermore, in this case, the reaction may be carried out by suitably adding as crosslinking agent a polyfunctional monomer such as divinyl benzene, ethylene dimethacrylate, triallyl cyanurate or triallyl isocyanurate.

Examples of vinyl monomers reacted in the presence of the rubbery polymer include aromatic vinyl compounds such as styrene and α-methyl styrene, acrylic esters such as methyl acrylate and ethyl acrylate and methacrylic esters such as methyl methacrylate and ethyl methacrylate. These monomers may be used alone or as a combination of two or more types. In addition, they may be copolymerized with other vinyl monomers such as vinyl cyanide compounds such as acrylonitrile and methacrylonitrile, and vinyl ester compounds such as vinyl acetate and vinyl propionate. This polymerization reaction can be carried out by various methods such as block polymerization, suspension polymerization and emulsion polymerization, with emulsion polymerization being particularly preferable.

The core-shell type grafted rubbery elastic body obtained in this manner preferably contains 20% by mass or more of the rubbery polymer. An example of this type of core-shell type grafted rubbery elastic body is an MAS resin elastic body such as a grafted copolymer of 60 to 80% by mass of n-butyl acrylate, styrene and methyl methacrylate. Among these, a compound rubbery grafted copolymer having a structure in which 5 to 95% by mass of a polysiloxanes rubber component and 95 to 5% by mass of a polyacryl (meth)acrylate rubber component are mutually intertwined to as to be unable to be separated, and which is comprised by graft polymerization of at least one type of vinyl monomer to a compound rubber having a mean particle diameter of about 0.01 to 1 µm, is preferable. This copolymer is more effective in improving impact resistance than graft copolymers of each of the rubbers alone. An example of a commercially available product of this compound rubbery grafted copolymer is Metablen S-2001 (Mitsubishi Rayon).

In addition, the flame-resistant engineering plastic composition of the present invention may also contain an inorganic filler as necessary. An inorganic filler is able to further improve the rigidity and heat resistance of molded products.

Examples of inorganic fillers include talc, mica, kaolin, diatomaceous earth, calcium carbonate, calcium sulfate, barium sulfate, glass fibers, carbon fibers and potassium titanate fibers. Among these, flake-shaped inorganic fillers such as talc and mica as well as fibrous inorganic fillers are preferable.

In addition, the talc is an aqueous silicate of magnesium, and commercially available products can typically be used. The average particle diameter of talc and other inorganic fillers is 0.1 to 50 µm and preferably 0.2 to 20 µm. As a result of containing these inorganic fillers, and particularly talc, in addition to having the effect of improving rigidity, the blended amount of flame retardant can be reduced.

The aforementioned inorganic filler is preferably contained at 1 to 100 parts by mass, and more preferably at 2 to 50 parts by mass, with respect to a total of 100 parts by mass of aromatic polycarbonate resin (A) and fluidity improver (B). Here, if the amount of inorganic filler is less than 1 part by mass, there are in cases in which the target effects of improving rigidity and flame resistance are not adequate, while if the blended amount exceeds 100 parts by mass, there are cases in which impact resistance and melt fluidity decrease. Thus, the blended amount of inorganic filler can be suitably determined in consideration of the required properties and moldability of molded products, such as molded product thickness and resin flow length.

In addition, the flame-resistant engineering plastic composition of the present invention can also contain various other additive components as necessary in addition to aromatic polycarbonate resin (A), fluidity improver (B) and flame retardant (C) for the purpose of improving moldability, impact resistance, appearance, weather resistance, rigidity and so forth.

Examples of the aforementioned additives include thermal stabilizers, oxidation inhibitors, antistatic agents, polyamide-polyether block copolymers (which impart performance tat prevents permanent charging), benzotriazole-based or benzophenone-based ultraviolet absorbers, hindered amine optical stabilizers (weather resistance agents), antimicrobials, compatibility agents and colorants (dyes and pigments). There are no particular limitations on the blended amounts of these arbitrary components provided they are within a range that maintains the characteristics of the flame-resistant engineering plastic composition of the present invention.

There are no particular limitations on specific physical property values of the flame-resistant engineering plastic composition of the present invention and they should be suitably adjusted as desired. However, fluidity is preferably improved to at least 20% to 30% higher with respect to the base resin. Furthermore, the method for evaluating fluidity complies with the flammability test of UL94.

In addition, with respect to impact strength, the Izod impact strength is preferably 400 J/m or more when tested in compliance with ASTM D256.

In addition, with respect to separation resistance, there is preferably no surface layer separation observed when evaluated in compliance with the previously mentioned tape peeling test.

In addition, with respect to heat resistance, the deflection temperature under load is preferably 90 to 110° C. when tested in compliance with ASTM D648.

As has been explained above, the thermoplastic resin composition of the present invention having the aforementioned physical properties has an extremely superior balance among fluidity, heat resistance, separation resistance and impact strength.

Next, an explanation is provided of a process for producing the flame-resistant engineering plastic composition of the present invention.

The aforementioned flame-resistant engineering plastic composition is obtained by mixing and kneading engineering plastic (C), fluidity improver (D) and flame retardant (F), preferably at the ratios previously described, as well as various other arbitrary components such as a non-drip agent, core-shell type grafted rubbery elastic body and so forth at suitable ratios as necessary. Although the blending and kneading at this time can be carried out using a method consisting of preliminarily mixing with ordinarily used equipment such as a ribbon blender or drum blender, followed by blending and kneading using a Henschel mixer, Banbury mixer, single-screw extruder, double-screw extruder, multi-screw extruder or kneader, the use of a continuously extruding molding machine such as a single-screw extruder or multi-screw extruder that is a melt kneading machine equipped with a vent capable of removing as much as possible to a certain level volatile components by forcibly discharging from the vent during melt kneading, and particularly a melt kneading extruder equipped with a vent, is preferable.

In addition, an extruder equipped with a plurality of raw material supply sections in the direction of molding raw material flow can be used preferably for the extruder. Examples of methods that can be used include a method in which raw material components other than a phosphate ester compound or other flame retardant are melt kneaded followed by supplying a phosphate ester compound or other flame retardant to this kneaded product preferably in a molten state, and a method in which the engineering plastic and phosphate ester compound or other flame retardant are first melt kneaded followed by kneading with the fluidity improver.

The heating temperate during melt kneading is normally suitably selected within the range of 240 to 300° C.

Furthermore, contained components other than engineering plastic (C) and fluidity improver (D) can also be added in advance during melt kneading with engineering plastic (C), fluidity improver (D) or other thermoplastic resins, namely in the form of a master batch.

Each engineering plastic composition obtained in this manner can be used to obtain various molded products of a desired shape by molding according to various molding methods known in the prior art such as injection molding, hollow molding, extrusion molding, compression molding and calendar molding.

Molded products obtained from each engineering plastic composition of the present invention are preferably used in the field of housings and various parts of OA equipment, telecommunications equipment and home appliances such as photocopiers, facsimiles, televisions, radios, tape recorders, video decks, personal computers, printers, telephones, information terminals, refrigerators and microwave ovens, as well as in other fields such as automotive parts.

As has been explained above, since each engineering plastic composition of the present invention contains a predetermined amount of the thermoplastic resin composition (fluidity improver D) of the present invention, together with having superior heat resistance, separation resistance, impact resistance and flame resistance, it also has superior fluidity (moldability and formability). Namely, the use of this engineering plastic composition makes it possible to both easily and stably mold molded products of an arbitrary shape, including complex-shaped or thin-walled molded products, that also have superior physical properties.

EXAMPLES

The following provides a more detailed explanation of the present invention through its examples. Furthermore, in the following descriptions, "parts" and "%" refer to "parts by mass" and "% by mass" unless specifically indicated otherwise.

Production of Thermoplastic Resin Composition (Fluidity Improver)

(Fluidity Improver 1)

1.0 part (solid component) of anionic emulsifier ("Latemul ASK", Kao Corporation, solid component: 28%) and 290 parts of distilled water were charged into a separable flask equipped with a cooling tube and a siring device, and heated to 80° C. in a water bath in the presence of a nitrogen atmosphere. Next, 0.0004 parts of ferrous sulfate, 0.0012 parts of ethylene diamine disodium tetraacetate and 0.5 parts of rongalite were added after dissolving in 5 parts of distilled water followed by dropping in a mixture of 10 parts of butyl acrylate, 0.1 part of allyl methacrylate, 0.05 parts of t-butyl hydroperoxide and 0.1 part of n-octyl mercaptan over the course of 18 minutes. The mixture was subsequently stirred for 60 minutes to complete the first stage of polymerization.

0.0004 parts of ferrous sulfate, 0.0012 parts of ethylene diamine disodium tetraacetate and 0.5 parts of rongalite were added to 5 parts of distilled water and dissolved, followed by dropping in a mixture of 27 parts of acrylonitrile, 63 parts of styrene, 0.45 parts of t-butyl hydroperoxide and 1.8 parts of n-octyl mercaptan over the course of 162 minutes. This mixture was subsequently stirred for 60 minutes to complete the second stage of polymerization and obtain an emulsion.

The solid component of the resulting emulsion was measured and found to be 24.2%. In addition, when this emulsion was poured into a dilute aqueous sulfuric acid solution followed by drying the precipitate that formed, the weight average molecular weight (Mw) of the component that was soluble in chloroform was 22,000.

(Fluidity Improver 2)

1.0 part (solid component) of anionic emulsifier ("Latemul ASK", Kao Corporation, solid component: 28%) and 290 parts of distilled water were charged into a separable flask equipped with a cooling tube and a siring device, and heated to 80° C. in a water bath in the presence of a nitrogen atmosphere. Next, 0.0004 parts of ferrous sulfate, 0.0012 parts of ethylene diamine disodium tetraacetate and 0.5 parts of rongalite were added after dissolving in 5 parts of distilled water followed by dropping in a mixture of 30 parts of butyl acrylate, 0.3 parts of allyl methacrylate, 0.15 parts of t-butyl hydroperoxide and 0.3 parts of n-octyl mercaptan over the course of 54 minutes. The mixture was subsequently stirred for 60 minutes to complete the first stage of polymerization.

0.0004 parts of ferrous sulfate, 0.0012 parts of ethylene diamine disodium tetraacetate and 0.5 parts of rongalite were then added to this after dissolving in 5 parts of distilled water, followed by dropping in a mixture of 21 parts of acrylonitrile, 49 parts of styrene, 0.35 parts of t-butyl hydroperoxide and 1.4 parts of n-octyl mercaptan over the course of 126 minutes. This mixture was subsequently stirred for 60 minutes to complete the second stage of polymerization and obtain an emulsion.

The solid component of the aforementioned emulsion was measured and found to be 24.6%. In addition, when this emulsion was poured into a dilute aqueous sulfuric acid solution followed by during the precipitate that formed, the weight average molecular weight (Mw) of the component that was soluble in chloroform was 22,000.

(Fluidity Improver 3)

310 parts of distilled water in which was dissolved 1 part of sodium dodecylbenzene sulfonate were added to a mixture of 100 parts of cyclic dimethyl siloxane oligomer and 2 parts of a graft crossing agent in the form of γ-methacryloyl oxypropyl dimethoxy methylsilane, and then stirred for 2 minutes at 10,000 rpm with a homomixer followed by passing twice through a homogenizer at a pressure of 20 MPa to obtain a stable, premixed organosiloxane latex.

On the other hand, 10 parts of dodecylbenzene sulfonic acid and 90 parts of distilled water were charged into a separable flask equipped with a condenser and a stirring device to prepare a 10% by mass aqueous solution of dodecylbenzene sulfonic acid. The aforementioned premixed organosiloxane latex was dropped in over the course of 4 hours while heating this aqueous solution to 85° C., after which the aforementioned temperature was maintained for 1 hour after completion of dropping followed by cooling. Next, after stirring this reaction product for 12 hours at room temperature, it was neutralized with 5% aqueous sodium hydroxide to obtain a latex. The concentration of the solid component of the latex obtained in this manner was 18.5%, the particle diameter distribution exhibited a single peak, and the weight average particle diameter was 60 nm.

30 parts (solid component) of latex L-1 were weighed out in a separable flask equipped with a cooling tube and a stirring device after which 295 parts of distilled water were charged into the flask followed by heating to 80° C. in a water bath in the presence of a nitrogen atmosphere. Next, 0.0004 parts of ferrous sulfate, 0.0012 parts of ethylene diamine disodium tetraacetate and 0.5 parts of rongalite were added after dissolving in 5 parts of distilled water followed by dropping in a mixture of 21 parts of acrylonitrile, 49 parts of styrene, 0.35 parts of t-butyl hydroperoxide and 1.4 parts of n-octyl mercaptan over the course of 126 minutes. This mixture was subsequently stirred for 60 minutes to complete the second stage of polymerization and obtain an emulsion.

The solid component of the aforementioned emulsion was measured and found to be 24.5%. In addition, when this emulsion was poured into an aqueous calcium acetate solution followed by drying the precipitate that formed, the weight average molecular weight (Mw) of the component that was soluble in chloroform was 30,000.

(Fluidity Improver 4)

1.0 part (solid component) of anionic emulsifier ("Latemul ASK", Kao Corporation, solid component: 28%) and 290 parts of distilled water were charged into a separable flask equipped with a cooling tube and a stirring device, and heated to 80° C. in a water bath in the presence of a nitrogen atmosphere. Next, 0.0004 parts of ferrous sulfate, 0.0012 parts of ethylene diamine disodium tetraacetate and 0.5 parts of rongalite were added after dissolving in 5 parts of distilled water followed by dropping in a mixture of 30 parts of butyl acrylate, 0.3 parts of allyl methacrylate and 0.15 parts of t-butyl hydroperoxide over the course of 54 minutes. The mixture was subsequently stirred for 60 minutes to complete the first stage of polymerization.

0.0004 parts of ferrous sulfate, 0.0012 parts of ethylene diamine disodium tetraacetate and 0.5 parts of rongalite were then added to this after dissolving in 5 parts of distilled water, followed by dropping in a mixture of 21 parts of acrylonitrile, 49 parts of styrene, 0.35 parts of t-butyl hydroperoxide and 0.35 parts of n-octyl mercaptan over the course of 126 minutes. This mixture was subsequently stirred for 60 minutes to complete the second stage of polymerization and obtain an emulsion.

The solid component of the aforementioned emulsion was measured and found to be 24.6%. In addition, when this emulsion was poured into a dilute aqueous sulfuric acid solution followed by drying the precipitate that formed, the weight average molecular weight (Mw) of the component that was soluble in chloroform was 120,000.

The monomer compositions (parts) used in the aforementioned Fluidity Improvers 1 through 4, the weight average molecular weights (Mw) of the resulting thermoplastic resin compositions (fluidity improvers), and the glass transition temperatures (° C.) of polymer segment (A) incompatible with polycarbonate resin and polymer segment (B) compatible with polycarbonate resin of each of the fluidity improvers are collectively shown in Table 1.

TABLE 1

|  |  | Fluidity Improver No. | | | |
|---|---|---|---|---|---|
|  |  | 1 | 2 | 3 | 4 |
| First stage | BA | 10 | 30 | — | 30 |
|  | AMA | 0.1 | 0.3 | — | 0.3 |
|  | n-octyl mercaptan | 0.1 | 0.3 | — | — |
|  | t-butyl hydroperoxide | 0.05 | 0.15 | — | 0.15 |
|  | Cyclic dimethyl siloxane oligomer | — | — | 30 | — |
|  | γ-methacryloyl oxyproyl dimethoxy silane | — | — | 0.6 | — |
| Second stage | AN | 27 | 21 | 21 | 21 |
|  | St | 63 | 49 | 49 | 49 |
|  | n-octyl mercaptan | 1.8 | 1.4 | 1.4 | 0.35 |
|  | t-butyl hydroperoxide | 0.45 | 0.35 | 0.35 | 0.35 |
| Weight average molecular weight (Mw) | | 22000 | 22000 | 30000 | 120000 |
| Glass transition temperature (° C.) | A | −54 | −54 | −123 | −54 |
|  | B | 90 | 90 | 90 | 90 |
| Melt viscosity (Pa · s) | | 48 | 25 | 100 | Not measured |

In the table, BA indicates butyl acrylate, AMA indicates allyl methacrylate, AN indicates acrylonitrile and St indicates styrene.

Examples 1-3 and Comparative Examples 1-3

Engineering Plastic Compositions

The thermoplastic resin compositions (fluidity improvers) obtained in the manner described above and each component were mixed at the ratios (mass ratios) shown in Table 2 followed by supplying to a double screw extruder (Model TEM-35, Toshiba Machine) and melt kneading at 280° C. to obtain engineering plastic compositions.

TABLE 2

|  |  |  | Examples | | | Comparative Examples | | |
|---|---|---|---|---|---|---|---|---|
|  |  |  | 1 | 2 | 3 | 1 | 2 | 3 |
| Composition | Fluidity improver | 1 | 5 |  |  |  |  |  |
|  |  | 2 |  | 5 |  |  |  |  |
|  |  | 3 |  |  | 5 |  |  |  |
|  |  | 4 |  |  |  | 5 |  |  |
|  | AS resin |  |  |  |  |  | 5 |  |
|  | PC |  | 95 | 95 | 95 | 95 | 95 | 100 |
| Evaluation | Melt fluidity (SPL: mm) |  | 230 | 202 | 194 | 155 | 169 | 141 |
|  | Surface layer separation |  | ◯ | ◯ | ◯ | ◯ | ◯ | ◯ |
|  | Deflection temperature under load (° C.) |  | 128 | 130 | 130 | 130 | 131 | 132 |
|  | Iz impact strength (J/m) |  | 944 | 901 | 927 | 800 | 900 | 822 |
|  | LOI (oxygen index: %) |  | 27 | 26 | 29 | 26 | 27 | 28 |

The following abbreviations and materials are used in the above table.

PC: Polycarbonate resin ("Iupilon S-2000F", Mitsubishi Engineering-Plastics)

AS resin: SAN resin ("SR05B", Ube Cycon, Mw: 63,000, glass transition temperature: 90° C.)

The engineering plastics produced in Examples 1 through 3 and Comparative Examples 1 through 3 were evaluated for (1) solid component, (2) weight average molecular weight (hw), (3) melt viscosity, (4) melt fluidity, (5) surface layer separation (separation resistance), (6) deflection temperature under load heat resistance), (7) Iz impact strength (impact resistance) and (8) flame resistance. Those results are shown in Table 2.

(Performance Evaluation Methods)

(1) Solid Component

The emulsion following polymerization was dried for 30 minutes at 170° C. after which it was weighed to determine the solid component.

(2) Weight Average Molecular Weight (Mw)

The weight average molecular weight was measured by converting from the eluate chloroform and polymethyl methacrylate using a gel permeation chromatograph (GPC).

(3) Melt Viscosity

The melt viscosity of the resin composition was measured under conditions consisting of nozzle D=1 mm, L/D=16, barrel temperature=170° C. and shearing speed=3,000 sec$^{-1}$ using a capillary rheometer (RH7 Twin Capillary, Borlin).

(4) Melt Fluidity

The spiral flow length (SFL) of the resulting engineering plastic compositions was measured using an injection molding machine ("IS-100", Toshiba Machine). Furthermore, the molding temperature was 280° C., the mold temperate was 80° C. and the injection pressure was 98 MPa. In addition, the wall thickness of the molded products was 2 mm and the width was 15 mm.

(5) Surface Layer Separation (Separation Resistance)

Cuts were made in the marks left by the ejector pins of the molded products followed by visual observation of the status of separation. Those results were evaluated using the evaluation criteria indicated below.

O: Satisfactory (no separation)
X: Surface layer separation observed (6) Deflection Temperature Under Load (Heat Resistance)

Molded products having a wall thickness of ¼ inch were molded using an injection molding machine ("IS-100", Toshiba Machine) using the resulting engineering plastic compositions.

The deflection temperature under load of the molded products was measured in compliance with ASTM D648. Furthermore, annealing was not performed and the load was 1.82 MPa.

(7) Iz Impact Strength (Impact Resistance)

Molded products having a wall thickness of ⅛ inch were obtained with an injection molding machine ("IS-100", Toshiba Machine) using the resulting engineering plastic compositions. The Iz impact strength of the resulting molded products were measured in compliance with ASTM D256. Furthermore, the measuring temperature was 23° C.

(8) Flame Resistance

A flammability test using the oxygen index method (LOI) was carried out in compliance with JIS K7201, and the minimum oxygen concentration expressed as the volume percentage in oxygen required for the material to continue burning was measured.

As is clear from the results of Table 2, the engineering plastic compositions obtained in Examples 1 through 3 demonstrated an extremely superior balance among fluidity, heat resistance, separation resistance and impact strength.

On the other hand, since the engineering plastic composition obtained in Comparative Example 1 had an excessively large weigh average molecular weight of the thermoplastic resin composition contained therein, adequate fluidity was not obtained as compared with the engineering plastic compositions obtained in Examples 1 through 3.

In addition, since the thermoplastic resin composition contained in the engineering plastic composition obtained in Comparative Example 2 was AS resin, adequate fluidity was not obtained as compared with the engineering plastic compositions obtained in Examples 1 through 3.

In addition, since the engineering plastic composition obtained in Comparative Example 3 did not contain a thermoplastic resin composition, adequate fluidity was not obtained as compared with the engineering plastic compositions obtained in Examples 1 through 3.

Examples 4-9 and Comparative Examples 4-9

Reinforced Engineering Plastic Compositions

Each component was mixed at the ratios (weight ratios) shown in Tables 3 and 4 followed by supplying to a double screw extruder (Model TEM-35, Toshiba Machine) equipped with a side feeder and melt kneading at 290° C. to obtain reinforced engineering plastic compositions.

TABLE 3

| | | Examples | | | Comparative Examples | | |
|---|---|---|---|---|---|---|---|
| | | 4 | 5 | 6 | 4 | 5 | 6 |
| | Fluidity improver | 1 | 2 | 3 | 4 | AS Resin 1 | |
| Composition | Polymer | 5 | 5 | 5 | 5 | 5 | |
| | PC resin 1 | 75 | 75 | 75 | 75 | 75 | 80 |
| | Glass fiber 1 | 20 | 20 | 20 | 20 | 20 | 20 |
| Evaluation | Melt fluidity (SPL: mm) | 300 | 310 | 290 | 240 | 255 | 235 |
| | Surface layer separation | O | O | O | O | O | O |
| | Bending strength (MPa) | 65 | 65 | 65 | 65 | 67 | 70 |
| | Bending elastic modulus (MPa) | 2540 | 2500 | 2520 | 2520 | 2540 | 2550 |
| | Iz impact strength (J/m) | 115 | 150 | 120 | 130 | 120 | 120 |
| | Deflection temperature under load (° C.) | 142 | 142 | 144 | 143 | 142 | 145 |

TABLE 4

|  |  | Examples | | | Comparative Examples | | |
| --- | --- | --- | --- | --- | --- | --- | --- |
|  |  | 7 | 8 | 9 | 7 | 8 | 9 |
|  | Fluidity improver | 1 | 2 | 3 | 4 | AS Resin 1 |  |
| Composition | Polymer | 5 | 5 | 5 | 5 | 5 |  |
|  | PC resin 1 | 75 | 75 | 75 | 75 | 75 | 80 |
|  | Carbon fiber 1 | 20 | 20 | 20 | 20 | 20 | 20 |
| Evaluation | Melt fluidity (SPL: mm) | 260 | 270 | 255 | 195 | 210 | 185 |
|  | Surface layer separation | ○ | ○ | ○ | ○ | ○ | ○ |
|  | Bending strength (MPa) | 80 | 83 | 85 | 80 | 80 | 85 |
|  | Bending elastic modulus (MPa) | 4850 | 4900 | 4900 | 4750 | 4800 | 5050 |
|  | Iz impact strength (J/m) | 87 | 88 | 85 | 90 | 88 | 90 |
|  | Deflection temperature under load (° C.) | 144 | 144 | 145 | 144 | 145 | 147 |

The following abbreviations and materials are used in the above table.

PC resin 1: Polycarbonate resin (Tarflon FN1700, Idemitsu Petrochemical)

AS resin 1: SAN resin ("SR05B", Ube Cycon, Mw: 63,000)

Glass fiber 1: CS03MAFT737K25 (Asahi Fiber Glass, average fiber length: 3 mm, average fiber diameter: 13 μm, urethane cohesive agent)

Carbon fiber 1: TR06U/B4E (Mitsubishi Rayon, average fiber length: 6 mm, average fiber diameter: 7 μm, urethane cohesive agent)

The engineering plastics produced in Examples 4 through 9 and Comparative Examples 4 through 9 were evaluated for (1) solid component, (2) weight average molecular weight (Mw), (3) melt viscosity, (4) melt fluidity, (5) surface layer separation (separation resistance), (6) deflection temperature under load (heat resistance), (7) Iz impact strength (impact resistance) and (9) bending strength and bending elastic modulus.

(9) Bending Strength and Beading Elastic Modulus

Test pieces were obtained having a wall thickness of ¼ inch with an injection molding machine (Toshiba Machine) using the resulting compositions.

The bending strength and bending elastic modulus of the resulting molded products were measured in compliance with ASTM D790. Furthermore, the measuring temperature was 23° C.

As is clear from Tables 3 and 4, the reinforced engineering plastic compositions obtained in Examples 4 through 9 exhibited extremely superior balance among rigidity, strength, heat resistance, fluidity, separation resistance and impact strength.

On the other hand, in the case of the reinforced engineering plastic compositions obtained in Comparative Examples 4 and 7, since the weight average molecular weight of the chloroform soluble component in the fluidity improver used is too large, adequate fluidity was not obtained as compared with the reinforced engineering plastic compositions obtained in Examples 4 through 9.

In addition, in the reinforced engineering plastic compositions obtained in Comparative Examples 5 and 8, since AS resin 1 was used for the fluidity improver, adequate fluidity was not obtained as compared with the reinforced engineering plastic compositions obtained in Examples 4 through 9.

In addition, since a fluidity improver was not used in Comparative Examples 6 and 9, the resulting reinforced engineering plastic compositions were unable to obtain adequate fluidity as compared with the reinforced engineering plastic compositions obtained in Examples 4 through 9.

Examples 10-15 and Comparative Examples 10-15

Flame-Resistant Engineering Plastic Compositions

Each component was mixed at the ratios (mass ratios) shown in Tables 5 and 6 followed by supplying to a double screw extruder (Model TEM-35, Toshiba Machine) and melt kneading at 280° C. to obtain thermoplastic resin compositions.

TABLE 5

|  |  | Examples | | | Comparative Examples | | |
| --- | --- | --- | --- | --- | --- | --- | --- |
|  |  | 10 | 11 | 12 | 10 | 11 | 12 |
| Composition | PC-1 | 95 | 95 | 95 | 95 | 95 | 100 |
|  | Fluidity improver 1 | 5 |  |  |  |  |  |
|  | Fluidity improver 2 |  | 5 |  |  |  |  |
|  | Fluidity improver 3 |  |  | 5 |  |  |  |
|  | Fluidity improver 4 |  |  |  | 5 |  |  |
|  | SAN-1 |  |  |  |  | 5 |  |
|  | Flame retardant | 5 | 5 | 5 | 5 | 5 | 5 |
|  | Non-drip agent | 0.3 | 0.3 | 0.3 | 0.3 | 0.3 | 0.3 |
| Evaluation | Melt fluidity (SPL: mm) | 320 | 300 | 280 | 225 | 240 | 200 |
|  | Surface layer separation | ○ | ○ | ○ | ○ | ○ | ○ |
|  | Deflection temperature under load | 115 | 116 | 115 | 115 | 116 | 116 |
|  | Iz impact strength (J/m) | 400 | 580 | 600 | 550 | 105 | 100 |
|  | UL/V0, V1, V2 test | V0 | V0 | V0 | V0 | V0 | V0 |

The following abbreviations and materials are used in the above table.

PC-1: Polycarbonate resin ("Iupilon S-2000F", Mitsubishi Engineering-Plastics)
SAN-1: SAN resin ("SR05B", Ube Cycon, Mw: 63,000)
Flame retardant: Triphenyl phosphine (Daihachi Chemical Industry)
Non-drip agent; Teflon (registered trademark) CD-1 (Asahi ICI Fluoropolymers)

TABLE 6

|  |  | Examples | | | Comparative Examples | | |
|---|---|---|---|---|---|---|---|
|  |  | 13 | 14 | 15 | 13 | 14 | 15 |
| Composition | PC-2 | 95 | 95 | 95 | 95 | 95 | 100 |
|  | PC-1 | 80 | 80 | 80 | 80 | 80 | 80 |
|  | ABS resin | 10 | 10 | 10 | 10 | 10 | 10 |
|  | SAN resin | 5 | 5 | 5 | 5 | 5 | 10 |
|  | Fluidity improver 1 | 5 |  |  |  |  |  |
|  | Fluidity improver 2 |  | 5 |  |  |  |  |
|  | Fluidity improver 3 |  |  | 5 |  |  |  |
|  | Fluidity improver 4 |  |  |  | 5 |  |  |
|  | SAN-1 |  |  |  |  | 5 |  |
|  | Flame retardant | 10 | 10 | 10 | 10 | 10 | 10 |
|  | Non-drip agent | 0.3 | 0.3 | 0.3 | 0.3 | 0.3 | 0.3 |
| Evaluation | Melt fluidity (SPL: mm) | 510 | 510 | 480 | 410 | 440 | 400 |
|  | Surface layer separation | ○ | ○ | ○ | ○ | ○ | ○ |
|  | Deflection temperature under load | 90 | 91 | 90 | 90 | 91 | 91 |
|  | Iz impact strength (J/m) | 660 | 560 | 760 | 700 | 680 | 670 |
|  | UL/V0, V1, V2 test | V0 | V0 | V0 | V0 | V0 | V0 |

The following abbreviations and materials are used in the above table.

PC-2: Polycarbonate resin (PC-1), ABS resin ("UX-050", Ube Cycon) and SAN resin ("SR30B", Ube Cycon, Mw: 11,700) were blended at the ratios shown in Table 6.
SAN-1: SAN resin ("SR05B", Ube Cycon, Mw: 63,000)
Flame retardant: Triphenyl phosphine (Daihachi Chemical Industry)
Nondrip agent: Teflon (registered trademark) CD-1 (Asahi ICI Fluoropolymers)

The flame resistant engineering plastics produced in Examples 10 through 15 and Comparative Examples 10 through 15 were evaluated for (1) solid component, (2) weight average molecular weight (Mw), (3) melt viscosity, (4) melt fluidity, (5) surface layer separation (separation resistance), (6) deflection temperature under load (heat resistance), (7) Iz impact strength (impact resistance) and (10) flame resistance.

Here, flame resistance was evaluated in the manner described below.

(10) Flame Resistance

Test pieces having a wall thickness of ⅛ inch were obtained with an injection molding machine (Model IS-100, Toshiba Machine) using the resulting compositions. The flame resistance of the resulting 5 molded products were evaluated based on the testing methods indicated in the combustion testing of UL94/V-0, V-1 and V-2 for flammability classification of Underwriters Laboratories Incorporated. Furthermore, standards equivalent to each of the V classifications of UL94 are roughly summarized as indicated below.

V-0: Average flame retention time after removing the point flame of 5 seconds or less, and no dropping of flaming particles that ignite absorbent cotton for all samples.

V-1: Average flame retention time after removing the point flame of 25 seconds or less, and no dropping of flaming particles that ignite absorbent cotton for all samples.

V-2: Average flame retention time after removing the point flame of 25 seconds or less and dropping of flaming particles that ignite absorbent cotton for their samples.

In addition, UL94 also stipulates tat a material must not be classified to a certain level if all of the test rods do not pass that V classification. In cases in which this condition is not satisfied, the level of the five test rods is the level of the test rod having the worst results. For example, in the case a single test rod is classified as V-2, then the classification level for all 5 test rods is V-2.

As is clear from Table 5, the flame-resistant engineering plastic compositions obtained in Examples 10 through 12 demonstrate extremely superior balance among fluidity, heat resistance, separation resistance and impact strength.

On the other hand, in the case of the flame-resistant engineering plastic composition obtained in Comparative Example 10, since the weight average molecular weight of the chloroform soluble component in tie fluidity improver used is too large, adequate fluidity was not obtained as compared with the flame-resistant engineering plastic compositions obtained in Examples 10 through 12.

In addition, in the flame-resistant engineering plastic composition obtained in Comparative Example 11, since SAN-1 was used for the fluidity improver, adequate fluidity was not obtained and impact strength was also inferior as compared with the flame-resistant engineering plastic compositions obtained in Examples 10 through 12.

In addition, since a fluidity improver was not used in Comparative Example 12, the resulting flame-resistant engineering plastic composition was unable to obtain adequate fluidity and was also inferior in terms of impact strength as compared with the flame-resistant engineering plastic compositions obtained in Examples 10 trough 12.

In addition, as is clear from Table 6, in the case of the flame-resistant engineering plastic composition obtained in Comparative Example 13, since the weight average molecular weight of the chloroform soluble component in the fluidity improver used is too large, adequate fluidity was not obtained as compared with the flame-resistant engineering plastic compositions obtained in Examples 13 through 15.

In addition, in the flame-resistant engineering plastic composition obtained in Comparative Example 14, since SAN-1 was used for the fluidity improver, adequate fluidity was not obtained as compared with the flame-resistant engineering plastic compositions obtained in Examples 13 through 15.

In addition, since a fluidity improver was not used in the flame-resistant engineering plastic composition obtained in Comparative Example 15, the resulting flame-resistant engineering plastic compositions were unable to obtain adequate fluidity as compared with the flame-resistant engineering plastic compositions obtained in Examples 13 through 15.

INDUSTRIAL APPLICABILITY

In the case of using the thermoplastic resin composition (fluidity improver D) of the present invention with an engineering plastic (C), fluidity can be improved without impairing the characteristics of engineering plastic (C).

According to the engineering plastic composition of the present invention, in addition to superior heat resistance, separation resistance, impact resistance and flame resistance, it also has superior fluidity (moldability and formability). In addition, the use of this engineering plastic composition allows molded products of arbitrary shapes, including molded products having complex shapes and thin-walled molded products, to be molded both easily and stably together with having superior physical properties, thereby making this extremely useful industrially.

According to the reinforced engineering plastic composition of the present invention, fluidity (moldability and formability) are improved without impairing the superior characteristics of inorganic filler-reinforced engineering plastics (namely, strength, rigidity, heat resistance, impact resistance and separation resistance), and an inorganic filler-reinforced engineering plastic composition having superior balance among strength, rigidity, heat resistance and fluidity in particular can be provided, thereby making this extremely useful industrially.

According to the flame-resistant engineering plastic composition of the present invention, melt fluidity (moldability and formability) is improved without impairing the superior characteristics of engineering plastics represented by polycarbonate such as heat resistance, separation resistance, impact resistance and flame resistance, and a flame-resistant engineering plastic composition having superior balance among these characteristics can be provided, thereby making this extremely useful industrially.

The present invention can be carried out in various other forms without deviating from the spirit or main characteristics of the present invention. Consequently, the aforementioned examples are merely intended to be exemplary of the present invention with respect to all aspects, and are not to be considered as limiting. The scope of the present invention is indicated by the appended claims and is not limited in any way by the test of this description. Moreover, all variations and alterations failing within the scope of the appended claims are included within the scope of the present invention.

The invention claimed is:

1. A thermoplastic resin composition, which is obtained by:
    graft polymerizing a monomer in the presence of a non-crosslinked polymer A to obtain a non-crosslinked polymer B; said polymer (B) being a graft copolymer comprising units of said polymer A and polymerized units of said monomer; and
    wherein a weight average molecular weight of a soluble component of said thermoplastic resin composition that dissolves in chloroform is 10,000 to 100,000;
    wherein said polymer (A) is incompatible with polycarbonate resin and is a polymer in which surface layer separation is observed by a tape peeling test according to JIS-K5400 by producing a molded test piece using an injection molding machine after melting and kneading at 270° C. in a double screw extruder 10% by mass of polymer (A) and 90% by mass (total: 100% by mass) of polycarbonate resin having a viscosity average molecular weight of 17,000 to 25,000;
    wherein said polymer (B) has compatibility with or affinity for polycarbonate resin and is a polymer in which surface layer separation is not observed by said tape peeling test using 10% by mass of polymer (B) and 90% by mass (total: 100% by mass) of polycarbonate resin having a viscosity average molecular weight of 17,000 to 25,000;
    wherein the polymer (A) is a polymer (A-1) having for its main component a polyalkyl acrylate having a glass transition temperature of 25° C. or lower, or a polymer (A-2) having for its main component polyorganosiloxane; and
    wherein the polymer (B) is a polymer selected from the group consisting of
    i) a polymer (B-1) having for its main component a homopolymer or copolymer of at least one alkyl(meth)acrylate and having a glass transition temperature that exceeds 25° C.,
    ii) a polymer (B-2) having for its main component a copolymer of an aromatic alkenyl compound and a vinyl cyanide compound, and
    iii) a polymer (B-3) having for its main component a copolymer of an alkyl(meth)acrylate and a vinyl cyanide compound or an aromatic alkenyl compound.

2. The thermoplastic resin composition according to claim 1, wherein the weight average molecular weight of the soluble component that dissolves in chloroform is 10,000 to 50,000.

3. The thermoplastic resin composition according to claim 1, wherein the weight average molecular weight of the soluble component that dissolves in chloroform is 10,000 to 30,000.

4. The thermoplastic resin composition according to any of claims 1 through 3, wherein a melt viscosity as measured with a capillary rheometer is 300 Pa·s or less.

5. The thermoplastic resin composition according to any of claims 1 through 3, wherein the polymer (B) is a polymer (B-2) having for its main component a copolymer of an aromatic alkenyl compound and a vinyl cyanide compound.

6. A fluidity improver, comprising:
    the thermoplastic resin composition according to any of claims 1 through 3.

7. An engineering plastic composition, comprising:
0.1 to 100 parts by mass of the fluidity improver according to claim 6 relative to 100 parts by mass of an engineering plastic.

8. The engineering plastic composition according to claim 7, wherein the engineering plastic comprises for its main component a polycarbonate resin.

9. An engineering plastic composition, comprising:
1 to 100 parts by mass of an inorganic filler relative to 100 parts by mass of the engineering plastic composition according to claim 7.

10. The engineering plastic composition according to claim 9, wherein the inorganic filler is a fibrous reinforcer comprising glass fiber and/or carbon fiber.

11. An engineering plastic composition, comprising:
0.1 to 30 parts by mass of a flame retardant relative to a total of 100 parts by mass of the engineering plastic composition according to claim 7.

12. The engineering plastic composition according to claim 11, wherein a non-drip agent is added at 0.05 to 5 parts by mass relative to a total of 100 parts by mass of the engineering plastic composition.

13. The engineering plastic composition according to claim 11, wherein the flame retardant is a phosphate ester compound.

14. The engineering plastic composition according to claim 12, wherein the non-drip agent is a fluoroolefin resin.

* * * * *